(12) United States Patent
Lankford et al.

(10) Patent No.: US 10,144,477 B2
(45) Date of Patent: Dec. 4, 2018

(54) GEAR DRIVE TWO-WHEEL SCOOTER

(71) Applicant: Zake IP Holdings, LLC, South Bend, IN (US)

(72) Inventors: Garrick Theodore Lankford, Elkhart, IN (US); Michael David Marston, Granger, IN (US); Weiwei Wang, GuangDong (CN); Yong Wang, GuangDong (CN)

(*) Notice: Subject to any disclaimer, the term of this patent is extended or adjusted under 35 U.S.C. 154(b) by 148 days.

(21) Appl. No.: 15/347,023

(22) Filed: Nov. 9, 2016

(65) Prior Publication Data
US 2018/0127047 A1   May 10, 2018

(51) Int. Cl.
| | | |
|---|---|---|
| B62K 11/00 | (2006.01) | |
| B62K 3/00 | (2006.01) | |
| B62K 11/14 | (2006.01) | |
| B62M 7/12 | (2006.01) | |
| B62J 99/00 | (2009.01) | |

(52) U.S. Cl.
CPC ............. *B62K 11/007* (2016.11); *B62J 99/00* (2013.01); *B62K 3/002* (2013.01); *B62K 11/14* (2013.01); *B62M 7/12* (2013.01); *B62J 2099/002* (2013.01); *B62J 2099/0013* (2013.01)

(58) Field of Classification Search
CPC ............... B62J 99/00; B62J 2099/0013; B62J 2099/002; B62K 3/002; B62K 11/007; B62K 11/14; B62M 7/12

USPC ......................................................... 180/218
See application file for complete search history.

(56) References Cited

U.S. PATENT DOCUMENTS

| | | | | |
|---|---|---|---|---|
| 9,376,155 | B2* | 6/2016 | Ying ..................... | B62D 51/001 |
| 2004/0188153 | A1* | 9/2004 | Liu ........................ | B62K 3/002 |
| | | | | 180/65.1 |
| 2005/0134014 | A1* | 6/2005 | Xie ....................... | B62D 51/001 |
| | | | | 280/93.502 |
| 2010/0243357 | A1* | 9/2010 | Yim ....................... | B25J 5/007 |
| | | | | 180/218 |
| 2014/0131126 | A1* | 5/2014 | Martinelli .............. | B62K 3/007 |
| | | | | 180/218 |
| 2016/0031515 | A1* | 2/2016 | Andreev ................ | B60G 21/05 |
| | | | | 180/218 |

* cited by examiner

*Primary Examiner* — Anne Marie M Boehler
*Assistant Examiner* — Felicia L. Brittman
(74) *Attorney, Agent, or Firm* — Botkin & Hall, LLP

(57) ABSTRACT

A gear drive balancing scooter is provided that has a left side, a right side, and a center section located between the left and right side. The center section is coupled to the right and left sides through a gear. As the left side moves with respect to the center section, the right side moves in an opposite direction with respect to the center section. Both sides have a respective wheel motor assembly that is used to balance the scooter. To steer the scooter, the user angles one side differently than the other side. The angle of each side determines the rate and direction that each wheel motor assembly rotates. An optional staff extends upwardly from the center section to provide stability.

19 Claims, 13 Drawing Sheets

GEAR DRIVE TWO-WHEEL SCOOTER

BACKGROUND OF THE INVENTION

This present disclosure relates to riding toys, namely two-wheeled scooters, designed for a single person to stand on and control by moving the position and angle of their feet. Other devices exist in the art, such as the well-known Segway® transporter, various aspects being covered in many U.S. patents. These require a steering bar or other member that the user rotates or twists to accomplish the steering. The forward and reverse direction is caused by the user shifting their weight. Another example is by Shane Chen, U.S. Pat. No. 8,738,278, covering a personal transporter with independently moveable foot placement sections. The Chen patent removes the steering bar and relies on the user tilting the independently moveable foot placement sections to move forward, backward, and steer.

The prior art has still-unresolved issues, such as the inherent instability of independently moveable foot placement sections. By allowing them to be fully independent, sudden directional changes are possible. The device can begin dangerous oscillations, particularly when the user is mounting or dismounting. The Chen patent discloses that each independent foot placement section controls a respective motor. The independent nature frequently causes an inexperienced rider to lose balance and fall, causing injuries and other harm. An improved device is needed.

SUMMARY OF THE INVENTION

The present disclosure describes a scooter, personal recreational toy, or fun travel device that is for a single user to ride, and by shifting their weight or changing the angle of their feet, can cause the device to steer, accelerate, decelerate, and perform various tricks. The device improves on the Chen patent by including a center section that couples the two halves. The left and right sections are tied together through a spider gear held in the center, allowing controlled movement between the left and right sections. By controlling the movement between the left and right sections, stability is increased, allowing for increased comfort and safety, particularly for the novice. Optionally, a return-to-center feature can be implemented using a spring, magnet, or other means to further stabilize the scooter and provide an easier learning curve for the beginner.

The present disclosure also relates to a synchronous movement scooter which includes a left side, a right side, and a rotating mechanism located between and coupled to both left and right sides. The rotating mechanism is meshed with a gear portion of the left side and a gear portion of the right side respectively through a drive gear. When a user angles the left side or the right side to turn over, the right side or the left side is automatically driven by the drive gear to turn over reversely, thus the synchronous movement scooter is controlled to turn left or right; moreover, the radius of rotation of the synchronous movement scooter is smaller so that it is easy for the user to operate and control the synchronous movement scooter, and hazards occurred during operating and controlling is prevented.

The movement principle of a synchronous movement scooter is mainly established on a fundamental principle called "dynamic stabilization (Dynamic Stabilization)", i.e., the automatic balancing ability of the scooter itself. After the posture state of a side is judged using built-in precise solid-state gyroscopes (Solid-State Gyroscopes), and a proper instruction is calculated out using a precise and high speed CPU, a motor is driven to achieve a balancing effect.

Generally, the synchronous movement scooter may be operated and controlled to swerve by angling the left and right sides or changing center of gravity; however, the radius of rotation of the synchronous movement scooter is too large, which is inconvenient to swerve in narrow space. Furthermore, the synchronous movement scooter may rotate in place by angling the left and right sides at the same time and making them turn over towards different directions; however, this operation and control manner requires a user to have excellent coordination, and it is generally easier for a beginner to grasp.

In order to solve the foregoing technical problems, the present disclosure discloses a synchronous movement scooter, characterized by including a left side, a right side, a rotating mechanism, two sensing devices and controllers, wherein the rotating mechanism comprises a connecting shaft, a left shaft sleeve, a right shaft sleeve and a drive gear, the left shaft sleeve and the right shaft sleeve are arranged in a left connecting portion of the left side and a right connecting portion of the right side respectively, the left end and the right end of the connecting shaft are sheathed in the left shaft sleeve and the right shaft sleeve respectively, the drive gear is pivoted in the connecting shaft and located between the left connecting portion and the right connecting portion, and is meshed with a left gear portion of the left connecting portion and a right gear portion of the right connecting portion; the two sensing devices are arranged in the left side and in the right side respectively; and the controllers are arranged in the left side and in the right side, and are connected to the sensing devices, a left drive motor of the left side and a right drive motor of the right side; wherein, the left side or the right side turns over, the left gear portion or the right gear portion drives the drive gear, and the drive gear drives the right gear portion or the left gear portion, so as to automatically drive the right side or the left side to turn over.

The left side further comprises a left shell, a left body, a left pedestal and a left wheel body, the left shell and the left pedestal are arranged above and below the left body respectively, the left wheel body is pivoted in a left pivot joint between the left body and the left pedestal and comprises a left tire and the left drive motor arranged on the center of the left tire; the right body further comprises a right shell, a right body, a right pedestal and a right wheel body, the right body and the right pedestal are arranged above and below the right body respectively, the right wheel body is pivoted in a right pivot joint between the right body and the right pedestal and comprises a right tire and the right drive motor arranged on the center of the right tire; and the left connecting portion and the right connecting portion are located at one side of the left body and the right body respectively, the left connecting portion is opposite to the right connecting portion, the left gear portion and the right gear portion are located at the upper ends of the left connecting portion and the right connecting portion respectively.

The two sensing devices optionally include a support mount and two angle and accelerometer gyroscopes respectively, the two support mounts are arranged in the left pedestal and the right pedestal respectively, and the two gyroscopes of each of the sensing devices are arranged at the two supporting ends of the support. The controller further includes a control circuit board and a power supply unit.

The two sensing devices can include an infrared sensor or a piezoelectric sensor respectively, the two infrared sensors or piezoelectric sensors are arranged in the left shell of the left side and the right shell of the right side respectively, the front sides of the left side and the right side are provided with an indicator lamp respectively, and the two infrared sensors or piezoelectric sensors and the two indicator lamps are connected to the control circuit board.

The left shell and the right shell are further extended and arranged on a left wheel cover and a right fender respectively, the left fender and the right fender are arranged above the left wheel and the right wheel; and the upper surfaces of the left shell and the right shell are further provided with an antiskid pedal respectively, and the two antiskid pedals are provided with a plurality of antiskid strips respectively.

The scooter may include anti-collision sensors, the anti-collision sensors may be arranged at the front sides and the rear sides of the left pedestal and the right pedestal respectively, and the anti-collision sensors are connected to the control circuit board. The controller further includes a charging port and a power switch, the charging port and the power switch are connected to the control circuit board.

Compared with the prior art, the present disclosure may acquire the following technical effects. The left and right scooter sides are automatically driven by the rotating mechanism to turn over relatively, so that the synchronous movement scooter is driven to rotate in a small radius of rotation; the insides of the left and right scooter bodies are provided with the sensing device respectively, and each of the sensing device senses the change of the gravity center of the corresponding side, and controls the rolling directions and speeds of the left and right wheel bodies; the left and right scooter bodies are provided with the infrared sensor or the piezoelectric sensor and the trample indicator lamp respectively, so that the object of identifying whether a user steps on the device, synchronous movement scooter is achieved; the left and right scooter bodies are provided with the antiskid pedal respectively, which prevents the user from slipping and falling over the scooter; and the left and right scooter bodies may optionally contain anti-collision sensors respectively to sense the distance between the synchronous movement scooter and an obstacle; when the distance is less than a safe distance, the synchronous movement scooter may slow down or stop moving, which prevents the scooter from colliding with the obstacle.

An optional aspect of the invention involves a handle that protrudes upwardly from the center section to assist the user for stability. The angle of the handle is determined by the average angle of both sides, such that when one side is angled forward and the other side is angled backward, the angle of the handle does not change.

BRIEF DESCRIPTION OF THE DRAWINGS

A preferred embodiment of this invention has been chosen wherein.

DESCRIPTION OF THE PREFERRED EMBODIMENT

Figure 1:
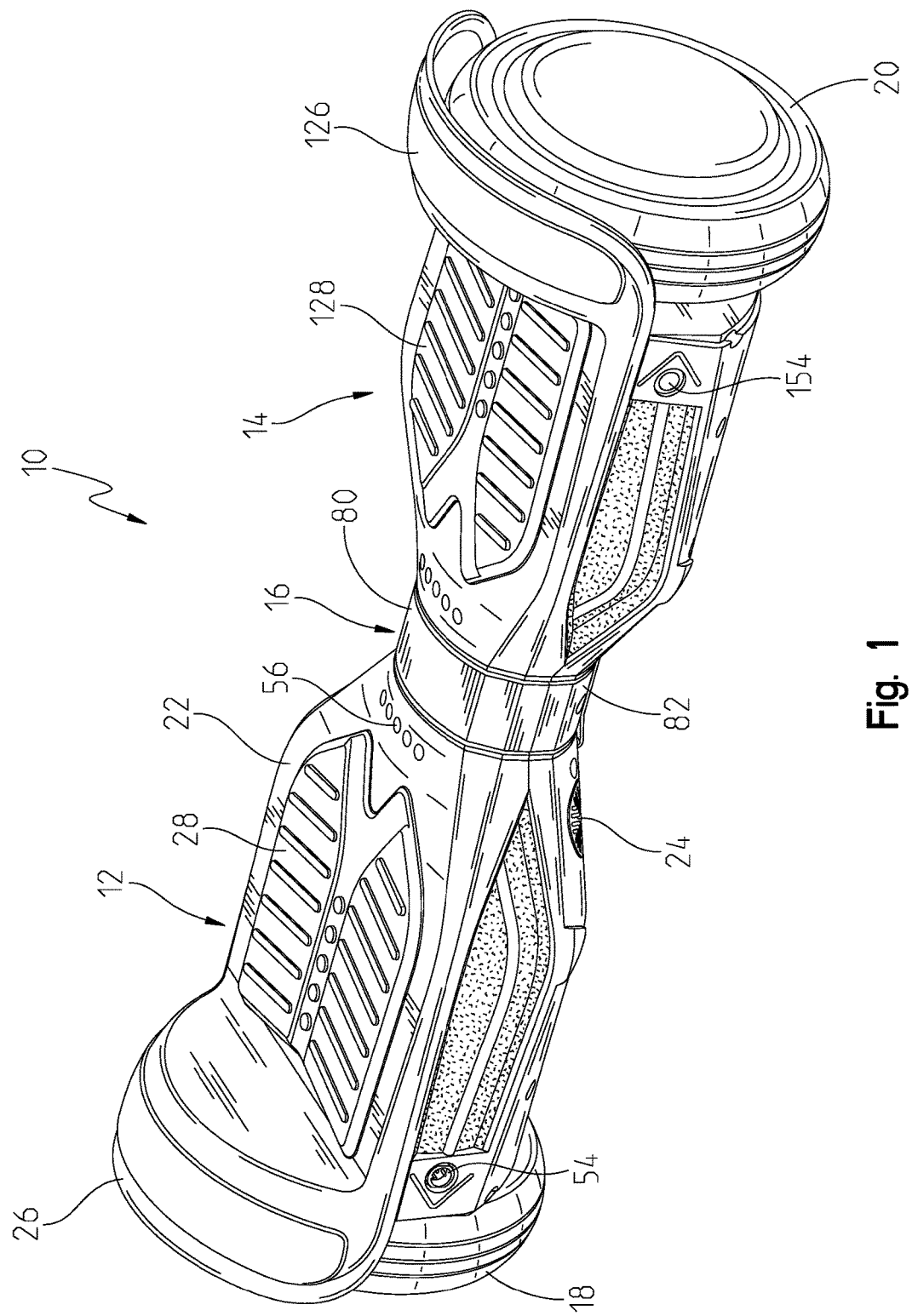
FIG. 1 is a top isometric view of the device.
Figure 2:
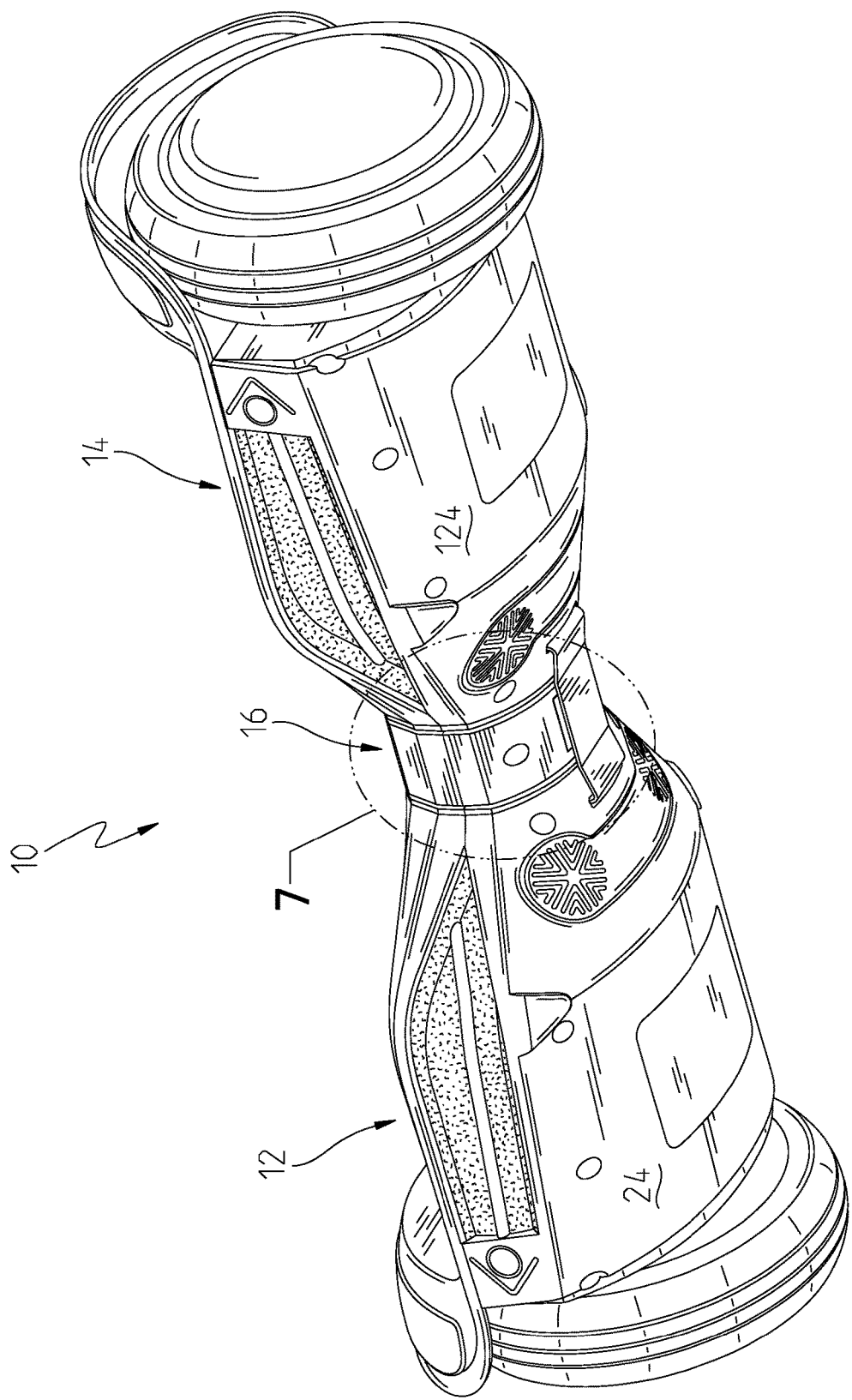
FIG. 2 is a bottom isometric view of the device.
Figure 3:
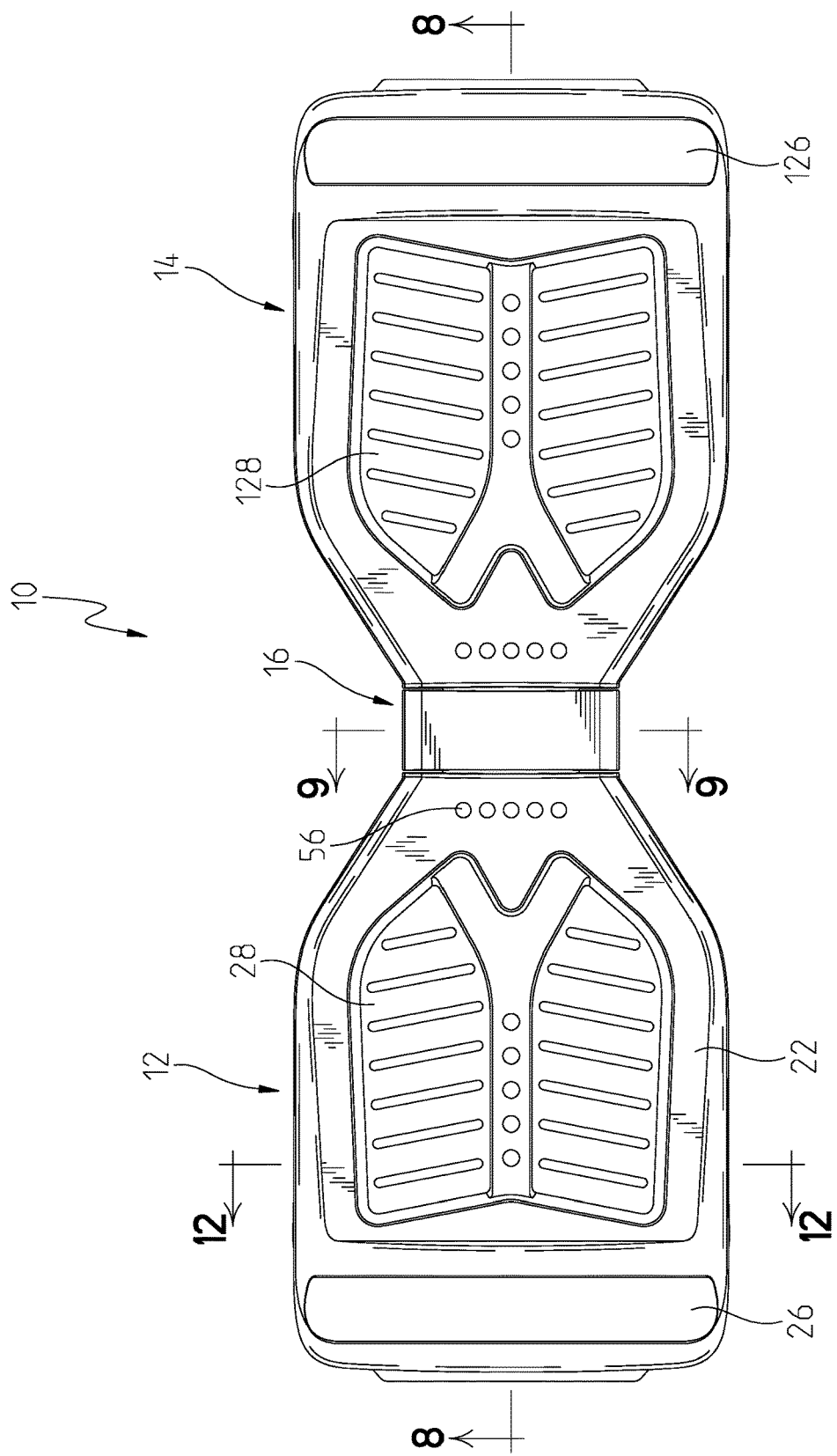
FIG. 3 is a top view of the device.
Figure 4:
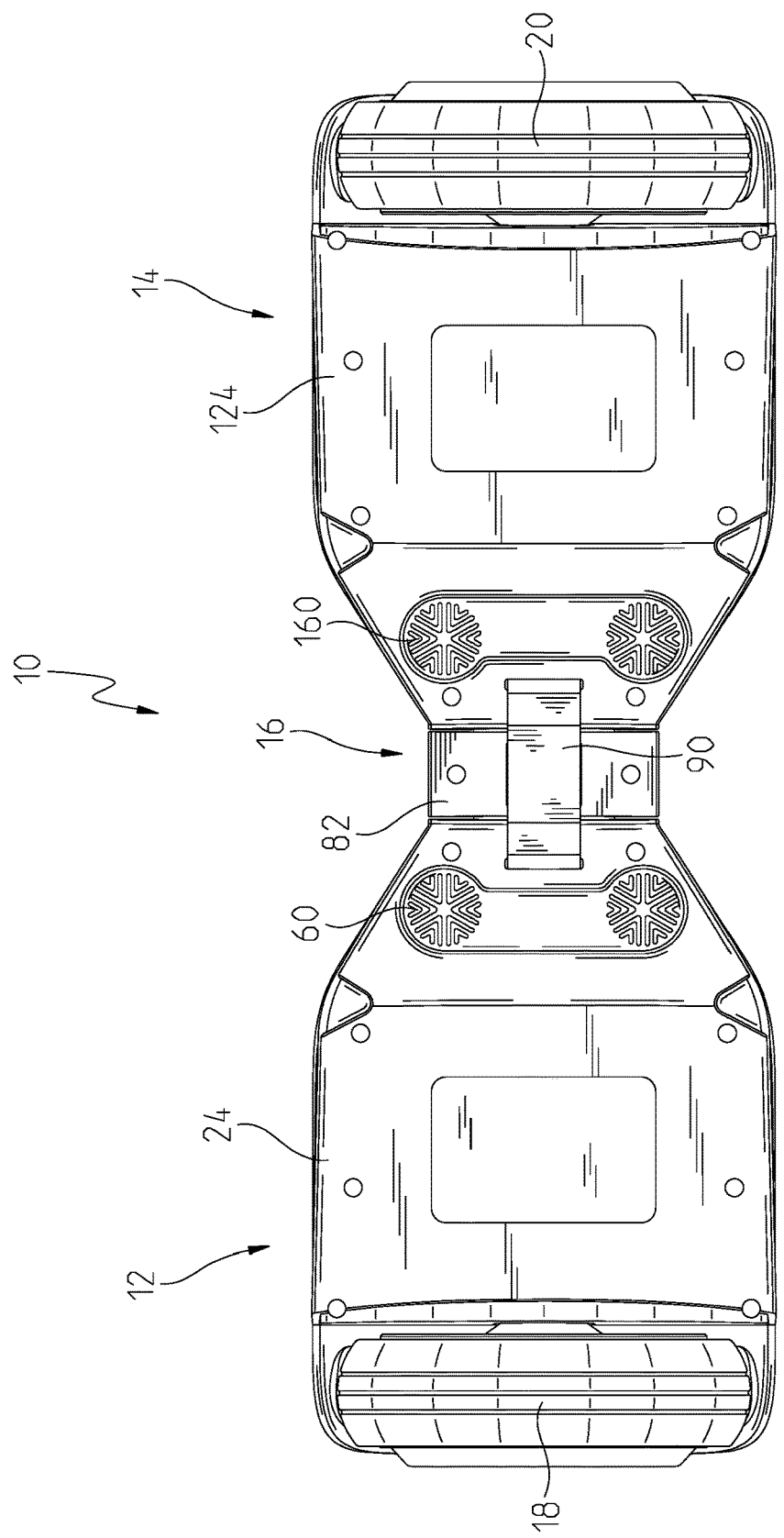
FIG. 4 is a bottom view of the device.
Figure 5:
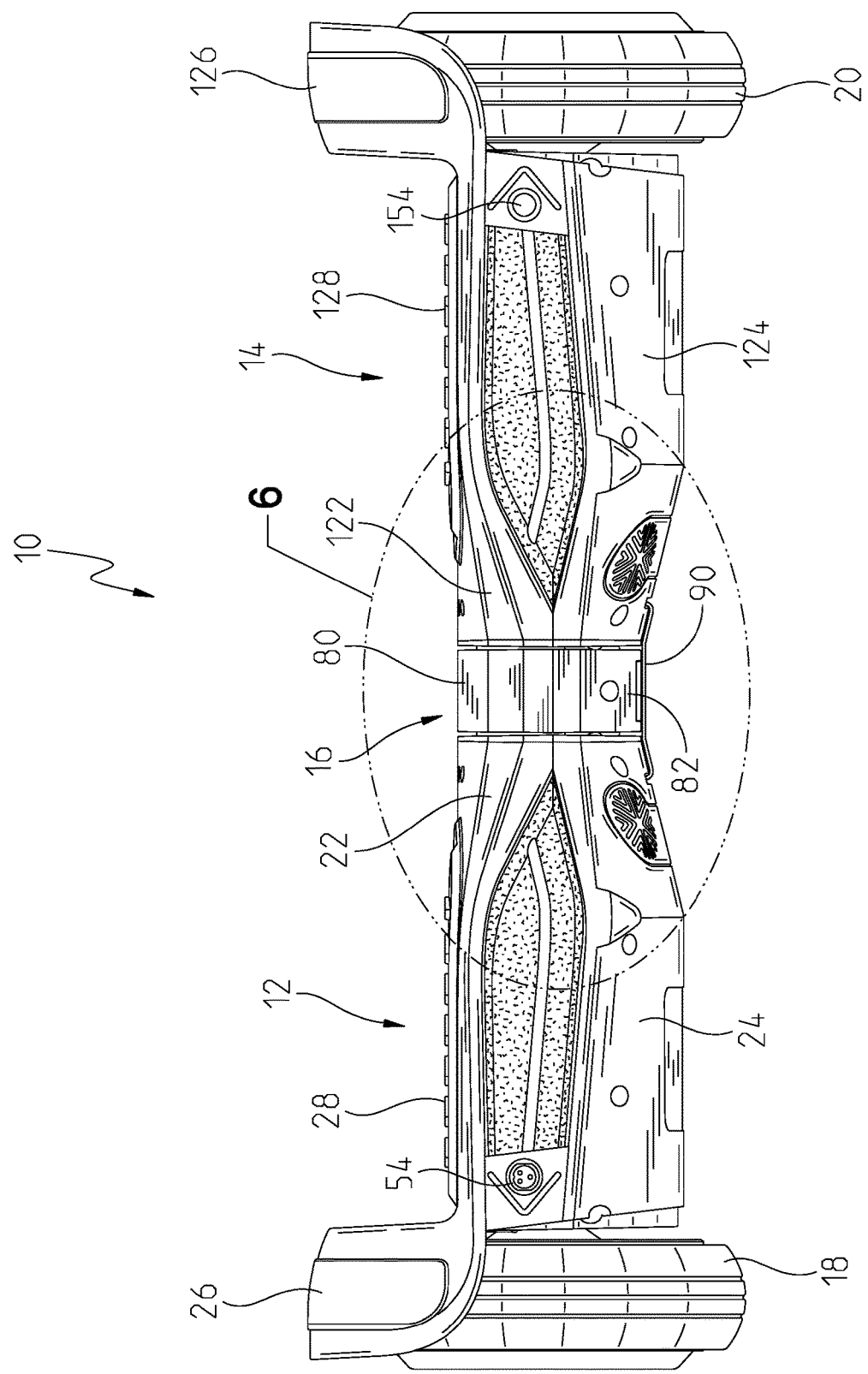
FIG. 5 is a rear view of the device.

A scooter 10 is shown in FIGS. 1-5 and has three primary portions. The portions include a left side 12, a right side, 14, and a center section 16. The left side 12 has a left wheel 18 and the right side 14 has a right wheel 20. Both are adapted to roll on the ground or other horizontal surface.

Figure 6:
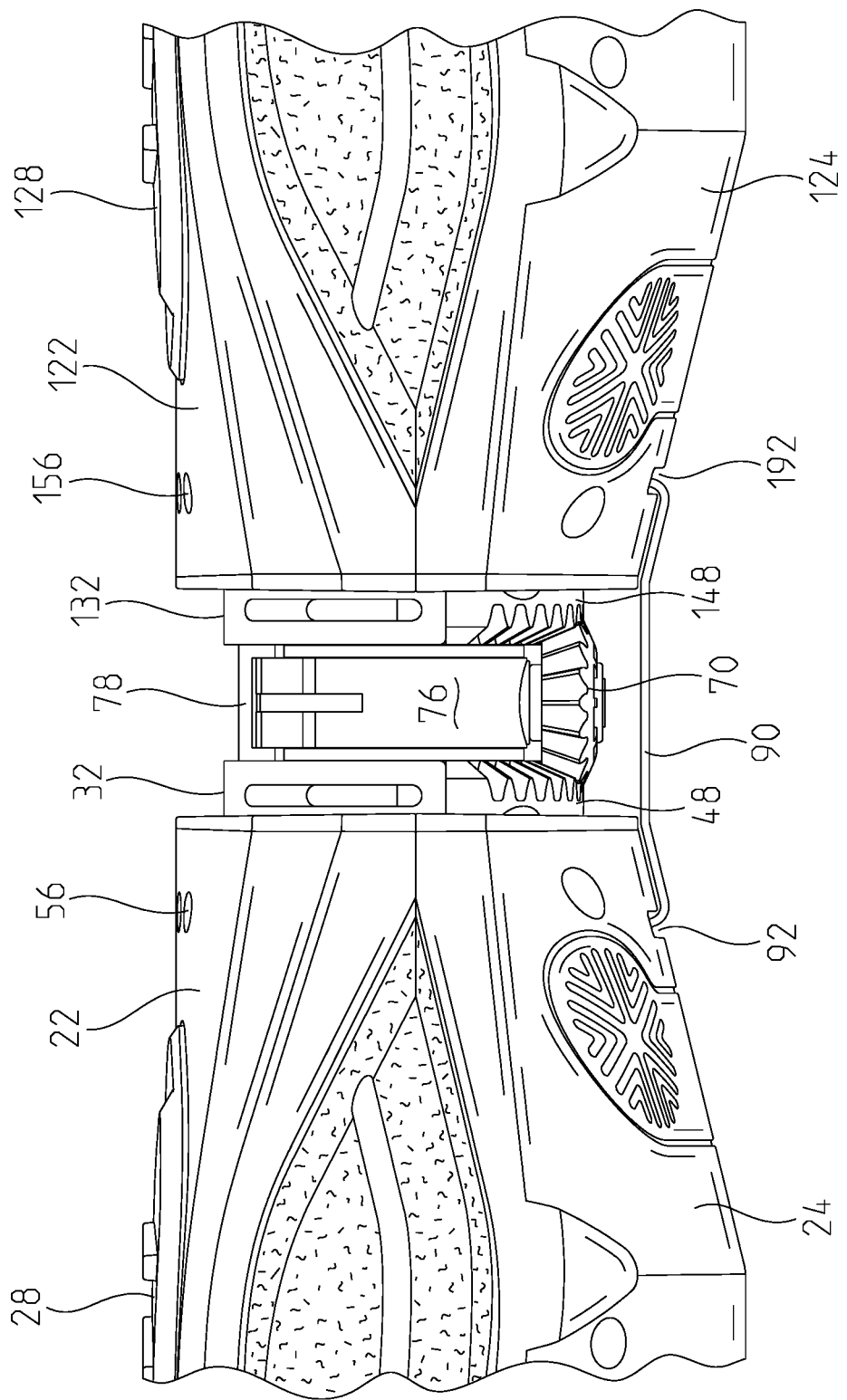
FIG. 6 is a partial section view of the device in FIG. 5.
Figure 8:
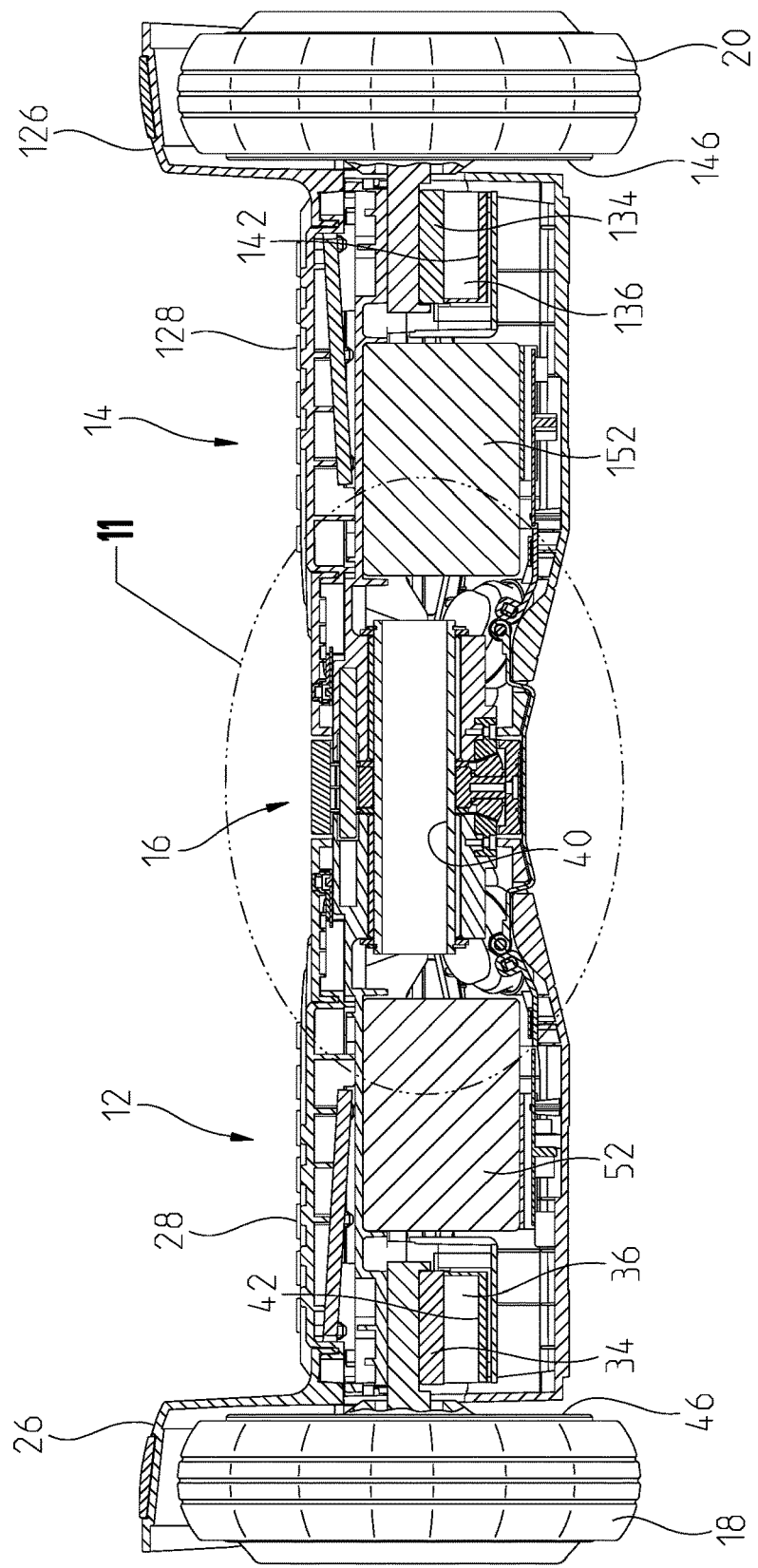
FIG. 8 is a section view 8-8 of the device in FIG. 3.
Figure 9:
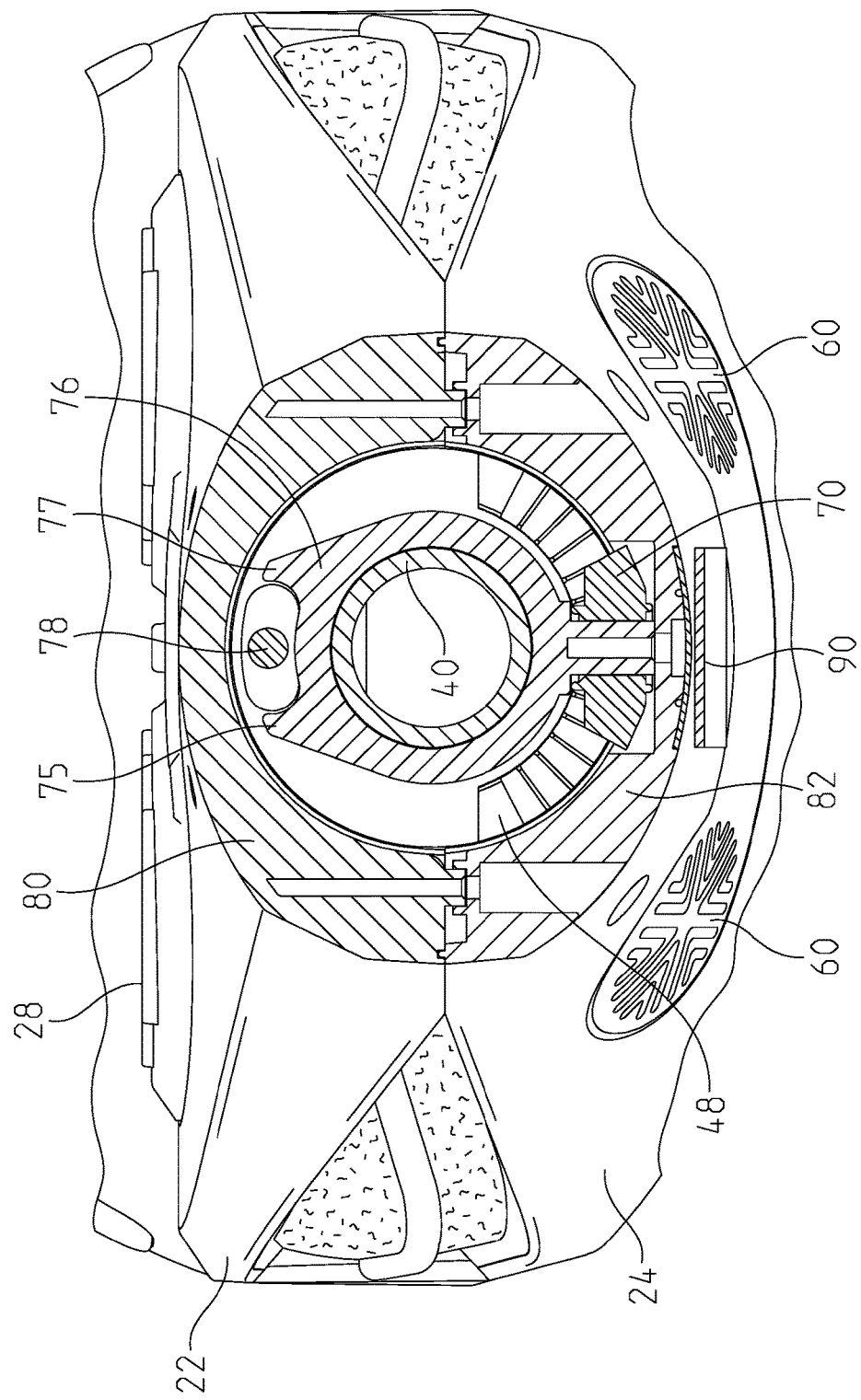
FIG. 9 is a section view 9-9 of the device in FIG. 3.
Figure 10:
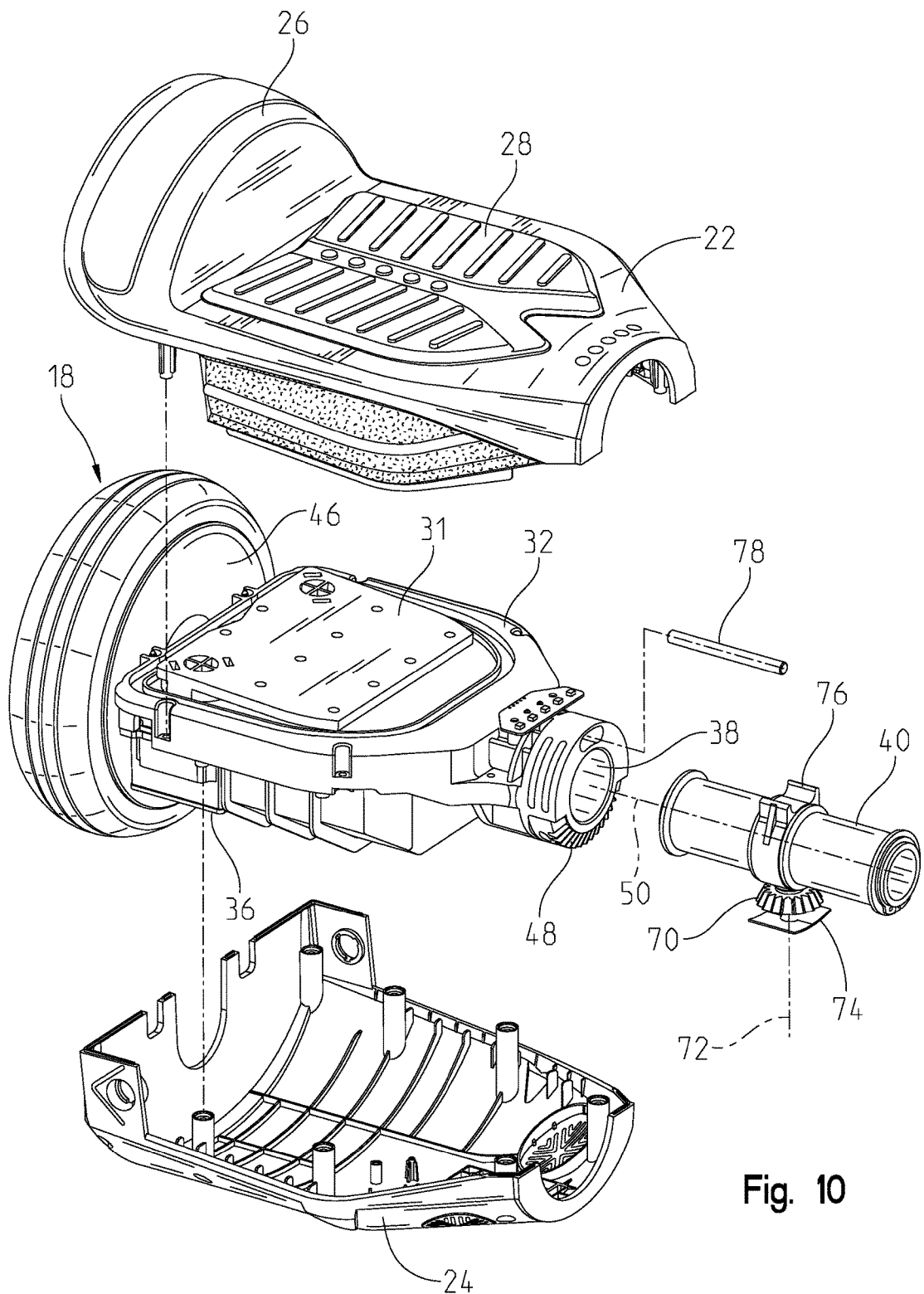
FIG. 10 is an exploded view of the left side and center section of the device in FIG. 1.
Figure 12:
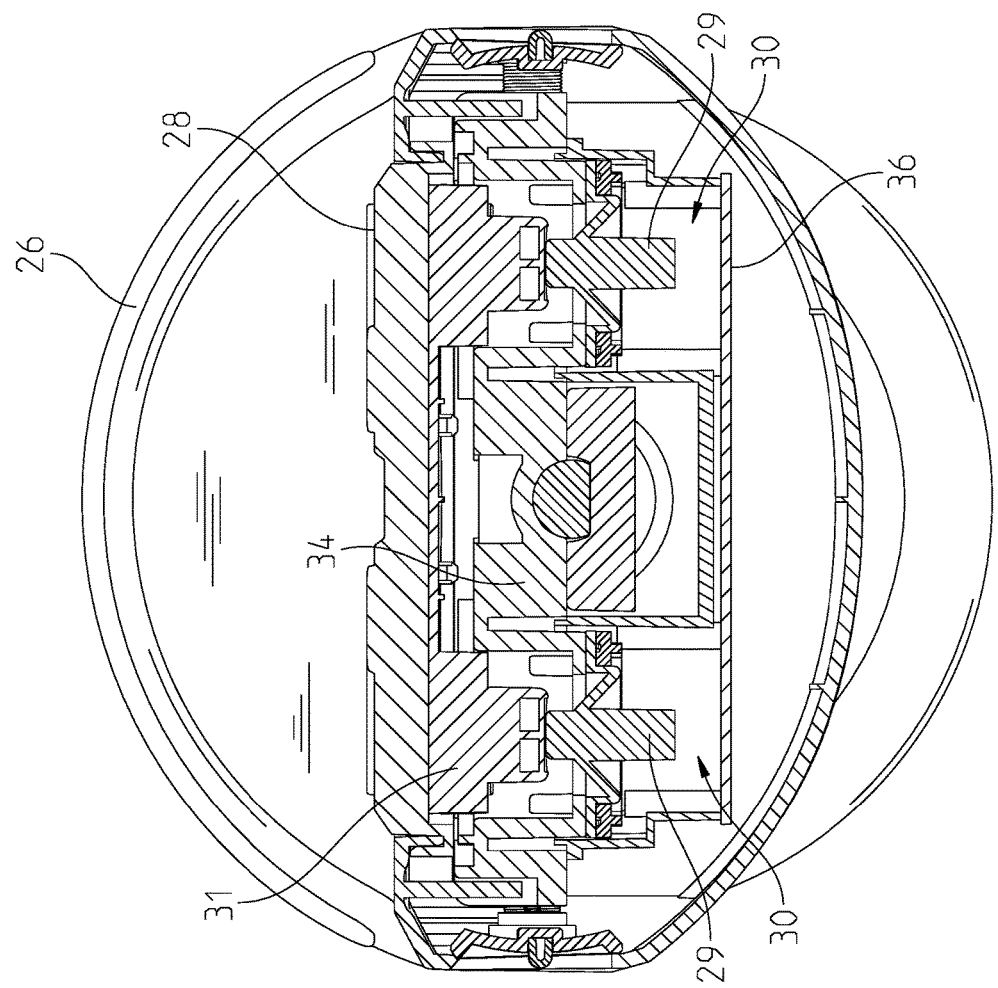
FIG. 12 is a section view 12-12 of the device as shown in FIG. 3.

Turning now to the detail of the left side 12, an upper housing 22 and a lower housing 24 form a protective and decorative cover for internal components and electrical connections, shown in FIGS. 6, 8, 10. As shown in FIG. 8, the left wheel 18 is attached on one side and is covered by a fender portion 26 of the upper housing 22. The left side 12, specifically the upper housing 22, further includes an anti-slip foot pad 28 that is made for the user to place their weight or stand on. The foot pad 28 may also contain a presence sensor 30 to detect the rider's presence. Directly underneath the foot pad 28 is a structure 31 that has downwardly extending protrusions 29 that change the state of the presence sensor 30. This is shown in FIG. 12. It is contemplated that the sensor 30 is contained elsewhere in the left side 12. The sensor 30 can change between a state where the rider is present and a state where the rider is present and applying weight to a portion of the left side 12. The sensor 30 can be as simple as a spring-return momentary switch or have other sensing technology such as load cells, non-contacting proximity, or further sensing technology not described herein. As shown in the exploded view in FIG. 10, between the upper housing 22 and lower housing 24 are several components. A frame 32 provides structural support for the housings 22, 24 and has several mounting points. The left wheel 18 is attached on a wheel attachment portion 34. The frame 32 also has mounting locations for a control board 36. The frame 32 further has a receiver 38 for a central shaft 40, shown in FIG. 10. As shown in FIG. 12, the control board 36 has the presence sensor 30. The foot pad 28 or structure 31 has the protrusions 29 that extend down and away from its upper surface to contact the presence sensor 30. Adjacent the receiver 38 is a gear portion 48, shown in FIG. 9. The gear portion 48, also referred to as a sector gear, shares a center point that is intersected by a receiver axis 50, shown in FIG. 10. The gear portion 48 is a portion of an entire gear, and it is contemplated that the gear portion is a complete gear. As shown, the gear portion 48 is affixed to the frame 32, but it is contemplated that the gear portion 48 is integral to the frame 32 or housings 22, 24.

The control board 36 further includes a level sensor 42 that detects the angle of the left side 12 with respect to the earth's gravity. The level sensor 42 reports the angle as a variable amount of tilt of the left side 12. The reported angle is the amount of forward and reverse tilt, with a neutral point between the transition between forward and reverse tilt. The neutral point is located where the left side 12, particularly the foot pad 28, is substantially parallel with the horizon. The control board 36 receives signals from the level sensor 42 and presence sensor 30 to determine the speed and direction for a motor 46 that is connected to the left wheel 18. As shown, the motor 46 is a brushless DC motor that has position sensor feedback and a series of coils (sensor and coils not shown). The sensor feedback in the motor 46 allows the control board 36 to appropriately enable the series of coils to drive the left wheel 18. Electric commutation of brushless DC (BLDC) motors is well known in the art. While the motor 46 described herein is a BLDC motor, it is contemplated that other types of motors could be used, such as a brushed DC, induction, or other type not disclosed herein.

The level sensor 42 can be a MEMS or other vibrating structure gyroscope sensor, commonly used in smartphones, portable gaming devices, and other electronic devices that sense angles. The level sensor 42 measures the angle of the left side 12 with respect to earth's gravity. Further, because the angle reported by gyroscopes can be influenced by dynamics, such as acceleration, vibration, and elevation changes, it is contemplated to further include an accelerometer in addition to the level sensor 42. Gyroscopes and comparable level sensors are well-known in the art. The data generated by the accelerometer can be combined with the data generated by the gyroscope to generate an angle that is much more accurate than one of those measuring devices alone. It is contemplated that the level sensor is another type that is not specifically described but functions to determine the angle of the left side 12 to the earth's gravity. It is further contemplated that the level sensor 42 is mounted elsewhere on the left side 12, while still detecting its angle. For example, the level sensor 42 detects the angle of the left side 12, typically the foot pad 28, such that when the left side 12 is at a slight angle in one direction, the control board 36 commands the motor 46 to rotate (and left wheel 18) in a first direction. If the angle of left side 12 increases, the control board 36 would increase the speed of the motor 46. If the left side 12 is tipped in the opposite direction, the control board 36 would reverse the direction of the motor 46. If the left side 12 is substantially level and the level sensor 42 is located at the neutral point, the control board 36 would stop the motor 46 from rotating. It is contemplated that the control board 36 includes other features, such as remote monitoring capabilities, Bluetooth accessories, speakers 60, and lighting. For example, lights 56 can provide important status of the device 10, such as battery life, charge status, or simply provide decorative illumination. It is further contemplated that the previously described other features are affixed to the housings 22, 24 or frame 32. The lights 56, 156 can be used to indicate battery charge by changing color or illuminating different segments.

The right side 14 is nearly identical and symmetrical to the left side 12 but will be described for clarity. The right side 14, an upper housing 122 and a lower housing 124 form a protective and decorative cover for internal components and electrical connections. The right wheel 20 is attached on one side and is covered by a fender portion 126 of the upper housing 122. The right side 14, specifically the upper housing 122, further includes an anti-slip foot pad 128 that is made for the user to place their weight or stand on. The foot pad 128 may also contain a presence sensor 130 to detect the rider's presence. It is contemplated that the sensor 130 is contained elsewhere in the right side 14. The sensor 130 can change between a state where the rider is not present and a state where the rider is present and applying weight to a portion of the right side 14. The sensor 130 can be as simple as a spring-return momentary switch or have other sensing technology such as load cells, non-contacting proximity, or further sensing technology not described herein. A frame 132 provides structural support for the housings 122, 124 and has several mounting points. The right wheel 20 is attached on a wheel attachment portion 134. The frame 132 also has mounting locations for a control board 136. As with the frame 32, frame 132 further has a receiver for a central shaft 40. As shown, the control board 136 has the sensor 130. The foot pad 128 has protrusions identical to protrusions 29 that extend down and away from its upper surface to contact the sensor 130. Adjacent the receiver is a gear portion 148. The gear portion 148, also referred to as a sector gear, shares a center point that is intersected by a receiver axis 50. The gear portion 148 is a portion of an entire gear, and it is contemplated that the gear portion is a complete gear. As shown, the gear portion 148 is affixed to the frame 132, but it is contemplated that the gear portion 148 is integral to the frame 132 or housings 122, 124.

The control board 136 further includes a level sensor 142 that detects the angle of the right side 14 with respect to earth's gravity. The level sensor 142 reports the angle as a variable amount of tilt of the right side 14. The reported angle is the amount of forward and reverse tilt, with a neutral point between the transition between forward and reverse tilt. The neutral point is located where the right side 14, particularly the foot pad 128, is substantially parallel with the horizon. The control board 136 receives signals from the level sensor 142 and presence sensor 130 to determine the speed and direction for a motor 146 that is connected to the right wheel 20. As shown, the motor 146 is a brushless DC motor that has position sensor feedback and a series of coils (sensor and coils not shown). The sensor feedback in the motor 146 allows the control board 136 to appropriately enable the series of coils to drive the right wheel 20. Electric commutation of brushless DC (BLDC) motors is well known in the art. While the motor 146 described herein is a BLDC motor, it is contemplated that other types of motors could be used, such as a brushed DC, induction, or other type not disclosed herein.

The level sensor 142 can be a MEMS or other vibrating structure gyroscope sensor, commonly used in smartphones, portable gaming devices, and other electronic devices that sense angles. The level sensor 142 measures the angle of the left side 12 with respect to earth's gravity. Further, because the angle reported by gyroscopes can be influenced by dynamics, such as acceleration, vibration, and elevation changes, it is contemplated to further include an accelerometer in addition to the level sensor 142. The data generated by the accelerometer can be combined with the data generated by the gyroscope to generate an angle that is much more accurate than one of those measuring devices alone. Gyroscopes and comparable level sensors are well-known in the art. It is contemplated that the level sensor is another type that is not specifically described but functions to determine the angle of the right side 14 to earth's gravity. It is further contemplated that the level sensor 142 is mounted elsewhere on the right side 14, while still detecting its angle. For example, the level sensor 142 detects the angle of the right side 14, typically the foot pad 128, such that when the right side 14 is at a slight angle in one direction, the control board 136 commands the motor 146 to rotate (and right wheel 20) in a first direction. If the angle of left side 12 increases, the control board 136 would increase the speed of the motor 146. If the right side 14 is tipped in the opposite direction, the control board 136 would reverse the direction of the motor 146. If the right side 14 is substantially level and the level sensor 142 is located at the neutral point, the control board 136 would stop the motor 146 from rotating. It is contemplated that the control board 136 includes other features, such as remote monitoring capabilities, Bluetooth accessories, speakers 160, and lighting. It is further contemplated that the scooter 10 has a single control board 36,136 in the left or right side 12, 14.

The left side 12 and right side 14 are powered by an onboard battery 52, 152, shown in FIG. 8. As shown, the battery 52,152 is located on both the left and right sides 12, 14, but it is contemplated that only one side holds a battery 52,152. A charging port 54 allows an external power source to restore charge to the battery 52, 152 or batteries after the rider depletes them from use.

It is commonplace to integrate controls inside of one main control board, also referred to as a motherboard, that would contain the software and logic that would control each of the motors 46, 146 and receive sensor data from the various sensors. The control boards 36, 136, as well as a motherboard, would have software that interprets the tilt of its respective side 12,14 and provide power to the appropriate motor and appropriate direction to maintain balance or motion. The software typically resides in a microcontroller or microcontrollers where the inputs involve the rotational position, speed, and direction of the wheels 18, 20. Other inputs are the angles of the sides provided by the respective level sensors 42, 142, along with the state of the rider presence sensors 30, 130. Further, the battery charge level, charging status, and other inputs are contemplated. In some embodiments, the control boards 36, 136 would only contain the necessary sensors to detect the presence of the rider and the angle of the side 12, 14. The motherboard would contain a single microcontroller to handle the functions for both sides, and the sensors and motors would communicate with the motherboard. Another embodiment is contemplated where the onboard battery 52 is located in only one side, and the motherboard is located where the battery 152 is presently shown. The battery 52, 152 provides power to the control boards 36, 136.

Figure 7:
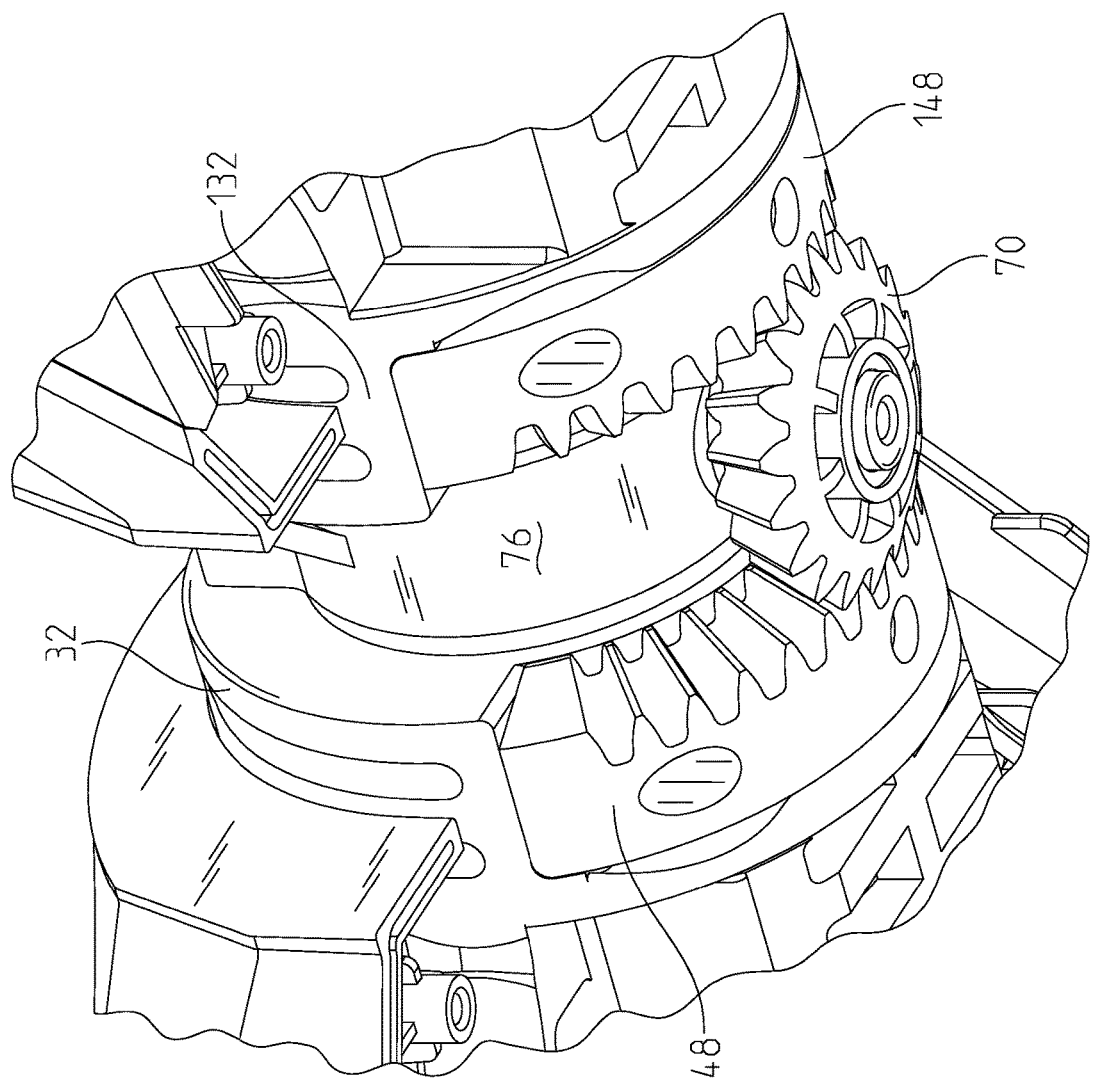
FIG. 7 is a partial bottom isometric view of the device in FIG. 2 showing the gear drive section and the lower covers removed.
Figure 11:
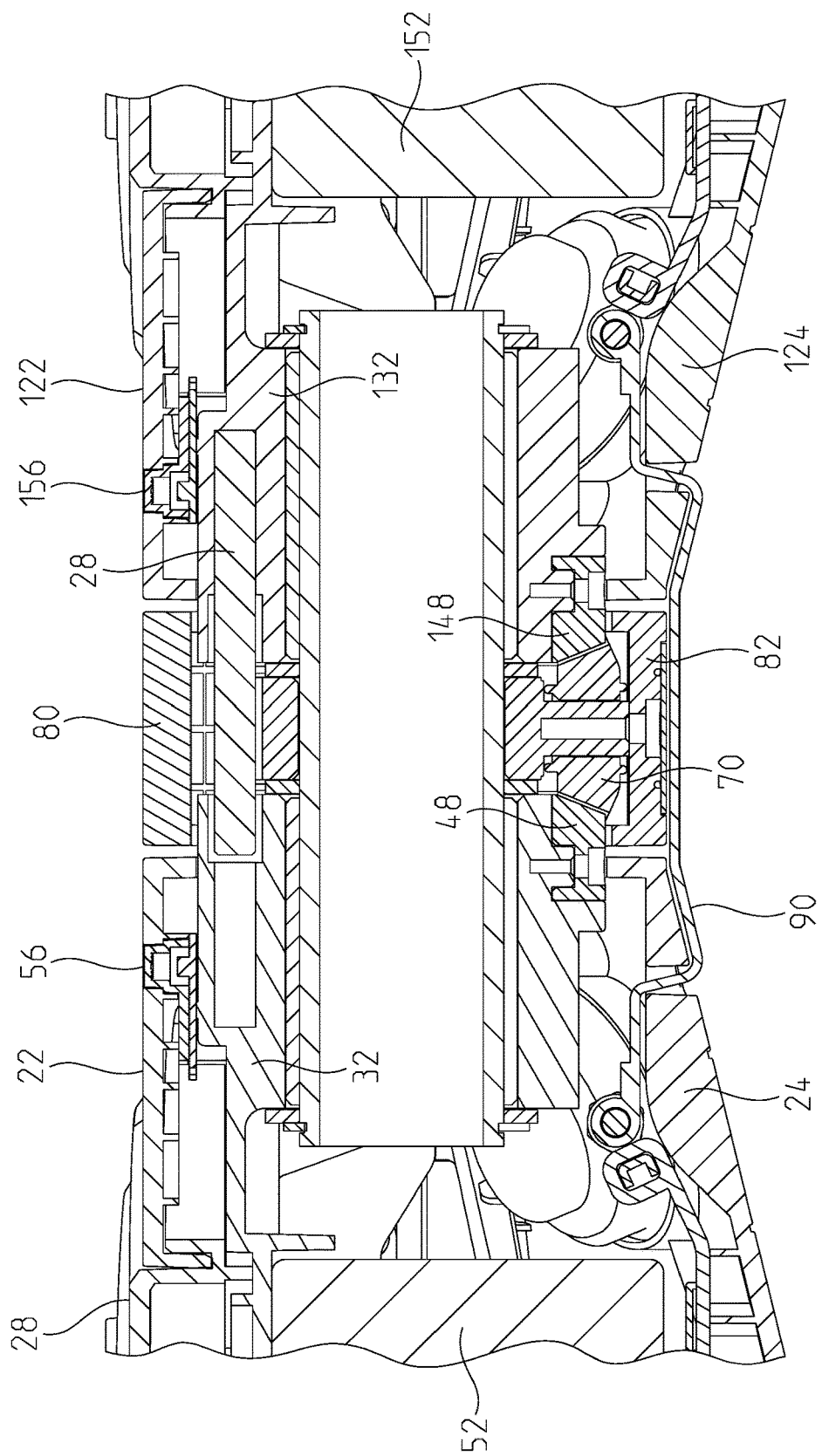
FIG. 11 is a partial view of the device in FIG. 8.

Rotatably connecting and located between the left side 12 and right side 14 is the center section 16, shown in FIG. 1. The center section 16 is located directly between the two, and serves to couple them. This is detailed in FIGS. 7, 9, and 11. A spider gear 70 meshes with gear portions 48, 148 to rotatably couple the left side 12 to the right side 14. The spider gear 70 rotates on a spider axis 72 and is held in by a fastener 74. The fastener 74 screws into a collar 76 that rides on the central shaft 40. The collar serves 76 to keep the spacing of the left side 12 and the right side 14 correct to maintain the proper meshing of the spider gear 70. As shown, the spider gear 70 rotates about an axis that extends outwardly and perpendicular to the receiver axis 50. The embodiment shows the spider gear 70 as a bevel gear, but other types of gears, such as worm, straight, hypoid, miter, helical, or spiral are contemplated.

A stop pin 78 engages the left side 12 and right side 14 to prevent excessive rotational movement of the left side 12 in relation to the right side 14. As shown in FIG. 9, the collar 76 has two upwardly protruding fingers 75, 77 that form a channel that the stop pin 78 passes through. A decorative top cover 80 and bottom cover 82 safely protect the user from getting fingers or other things pinched between the gears as they rotate. The covers 80, 82 also prevent objects from becoming entangled in the mechanism and creating issues with movement. It is contemplated that the covers 80, 82 contain other features, such as lights or external decoration that moves with the covers 80,82 or has external moving parts.

To control the scooter 10, first the user turns the power on with the power switch 154. If the batteries 52, 152 have sufficient charge, the control boards 36, 136 enable an indicator that the device is powered and any self-test passed. Next, the user puts a foot on one of the foot pads 28, 128, enabling the respective motor 46,146 and wheel 18, 20. The level sensor 42,142 reports the angle of the respective side 12, 14 to the control board 36,136 and moves the motor 46,146 one direction or the other, based on the angle. The user next puts the other foot on the other side 20, 18, tripping the other foot pad 128, 28 and enabling the other motor 46, 146 and wheel 20, 18. The other level sensor 142, 42 reports the angle of the other side 20, 18 and the control board 136,36 moves the other motor 146,46 and wheel 20, 18, based on the angle of the other side 20, 18.

Inside the control board 36, 136 or motherboard, a program runs that receives data from the level sensors 42, 142 and foot pads 28, 128 and, based on the angle and presence of the rider, will either rotate the respective wheel and motor in a forward or reverse direction based upon the angle of the respective side as calculated by the program. This program may include averaging function to filter out noise and allow more stability. The greater the angle of the level sensors 42, 142, the greater the torque or speed is applied to the motors 46,146 and wheels 18, 20. As speed increases, other factors may optionally be implemented by the control board 36, 136, such as a speed alarm or angular offset. If the scooter 10 is over a predetermined speed, an alarm may sound to indicate potentially dangerous condition to the user. Other options include a low battery alarm to indicate to the user that the scooter 10 needs to be recharged.

Figure 13:
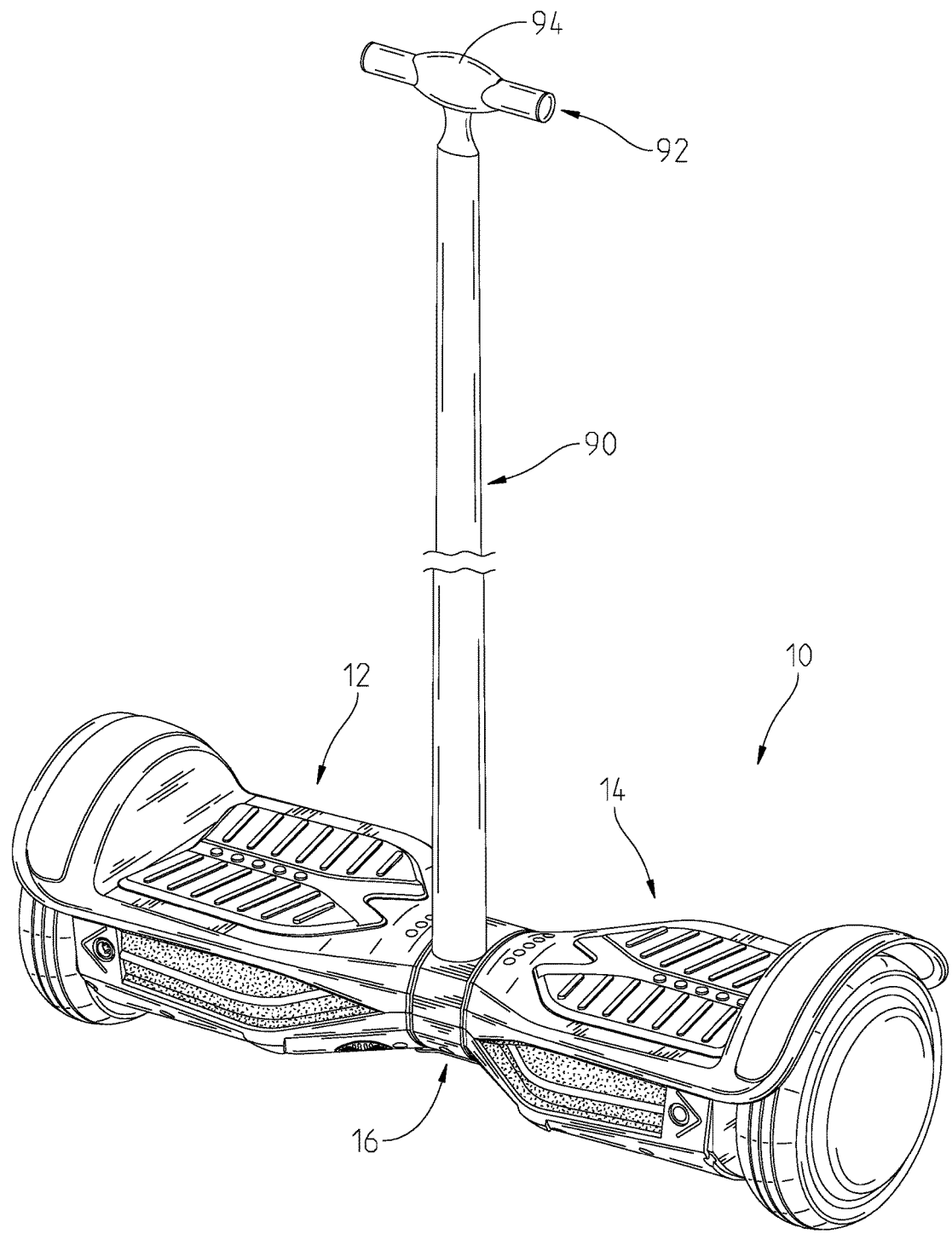
FIG. 13 is an isometric view of the device including a handle.

As shown in FIG. 13, the center section 16 may include a staff 90 that protrudes upwardly toward the user. At the end of the staff 90 is a handle 92 that the user can grip. The handle would provide stability for the rider, and because it is coupled to the center section 16, forward leaning of the handle would correspond to forward movement. If the user were to tip one of the sides 12,14 one direction and the other side 14, 12 in the opposite direction in the same amount, the angle of the handle would not change due to the gear driven coupling of the center section 16 to the sides 12,14. The handle 92 may include controls 94 or information about the scooter. The controls 94 would be in communication with the control board 36, 136. Further, the controls may include speakers, power switch, battery information, charge status, scooter speed, and other useful information or controls. Further, the staff 90 and handle 92 may be removable or collapsible to allow the scooter to be easily transported or stored. The staff 90 may be telescopically extendable between a stored position and an extended position. The scooter 10 is usable with or without the handle 92 and staff 90.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A two-wheeled scooter adapted for use by a rider along a surface, said surface being separate from said scooter, said scooter comprising:

a first portion having a first wheel rotatable about a first axis by a first motor, said first wheel adapted to contact said surface, said first motor in electrical communication with a control board, said first portion having a first level sensor and a first rider presence sensor in communication with said control board, said first rider presence sensor switchable between an absent state defined by said first rider presence sensor not detecting said rider and a present state defined by said first rider presence sensor detecting said rider in contact with said first portion;

a second portion having a second wheel rotatable about a second axis by a second motor, said second wheel adapted to contact said surface, said second motor in electrical communication with said control board, said second portion having a second level sensor and a second rider presence sensor in communication with said control board, said second rider presence sensor switchable between an absent state defined by said second rider presence sensor not detecting said rider and a present state defined by said second rider presence sensor detecting said rider in contact with said second portion;

when said first rider presence sensor is in said present state, said control board is adapted to rotate said first motor in a forward direction when said first level sensor detects a forward tilt, said control board is adapted to rotate said first motor in a reverse direction when said first level sensor detects a rearward tilt;

when said second rider presence sensor is in said present state, said control board is adapted to rotate said second motor in a forward direction when said second level sensor detects a forward tilt, said control board is adapted to rotate said second motor in a reverse direction when said second level sensor detects a rearward tilt;

a central shaft having an outside diameter with a central shaft axis;

said first portion receiving a portion of said central shaft and rotatable with respect to said central shaft on said central shaft axis, said first portion having a first gear rotatably fixed with respect to said first portion with a radius larger than said outside diameter of said central shaft, said first gear having a center coaxial to said central shaft axis;

said second portion receiving a portion of said central shaft and rotatable with respect to said central shaft on said central shaft axis, said second portion having a second gear having a radius larger than said outside diameter, said second gear having a center coaxial to said central shaft axis; and a center section located between said first and second portions and having a spider gear rotatable therewith, said spider gear meshing with said first and second gears, said spider gear rotatable about a spider axis fixed with respect to said center section, said spider axis is perpendicular to and intersecting said central shaft axis, when said first portion rotates with respect to said center section, said second portion rotates in a direction opposite said first portion, said center section having a staff extending from and fixed with respect to said center section, said staff being perpendicular to said central shaft axis.

2. The scooter according to claim 1, said first axis being coaxial to said second axis.

3. The scooter according to claim 2, said central shaft axis being coaxial to said first and second axes.

4. The scooter according to claim 1, said staff being removably affixed to said center section.

5. The scooter according to claim 1, said spider gear resisting rotation with respect to said center section.

6. The scooter according to claim 1, said staff having controls in communication with said control board.

7. A two-wheeled scooter adapted for use by a rider along a surface, said surface being separate from said scooter, said scooter comprising:

a motherboard in electrical communication with a first and a second motor;

a first portion having a first wheel rotatable about a first axis by a first motor, said first wheel adapted to contact said surface, said first motor in electrical communication with said motherboard, said first portion having a level sensor in communication with said motherboard, a rider presence sensor switchable between an absent state defined by said rider presence sensor not detecting said rider and a present state defined by said rider presence sensor detecting said rider in contact with said first portion;

a second portion having a second wheel rotatable about a second axis by a second motor, said second wheel adapted to contact said surface, said second motor in electrical communication with said motherboard, said second portion having a level sensor—in communication with said motherboard, a rider presence sensor switchable between an absent state defined by said rider presence sensor not detecting said rider and a present state defined by said rider presence sensor detecting said rider in contact with said second portion;

said motherboard is adapted to rotate said first motor in a forward direction when said level sensor detects a forward tilt, said motherboard is adapted to rotate said first motor in a reverse direction when said level sensor detects a rearward tilt;

said motherboard is adapted to rotate said second motor in a forward direction when said level sensor detects a forward tilt, said motherboard is adapted to rotate said second motor in a reverse direction when said level sensor detects a rearward tilt;

a central shaft having an outside diameter with a central shaft axis;

said first portion rotatable with respect to said central shaft on said central shaft axis, said first portion having a first gear rotatably fixed with respect to said first portion with a radius larger than said outside diameter of said central shaft, said first gear having a center coaxial to said central shaft axis;

said second portion rotatable with respect to said central shaft on said central shaft axis, said second portion having a second gear having a radius larger than said outside diameter, said second gear having a center coaxial to said central shaft axis; and a center section located between said first and second portions and having a spider gear rotatable therewith, said spider gear meshing with said first and second gears, said spider gear rotatable about a spider axis, said spider axis is perpendicular to and intersecting said central shaft axis, when said first portion rotates with respect to said center section, said second portion rotates in a direction opposite said first portion.

8. The scooter according to claim 7, said spider axis fixed with respect to said center section.

9. The scooter according to claim 8, said central shaft axis being coaxial to said first and second axes.

10. The scooter according to claim 7, said first and second gears being sector gears.

11. The scooter according to claim 7, said spider gear resisting rotation with respect to said center section.

12. The scooter of claim 7, when said rider presence sensors are in said absent state, said motherboard allowing said first and second wheels to freely rotate.

13. A two-wheeled scooter adapted for use by a rider along a surface, said surface being separate from said scooter, said scooter comprising:
- a first portion having a first wheel rotatable about a first axis by a first motor, said first wheel adapted to contact said surface, said first motor in electrical communication with a first control board, said first portion having a first level sensor in communication with said first control board;
- a second portion having a second wheel rotatable about a second axis by a second motor, said second wheel adapted to contact said surface, said second motor in electrical communication with a second control board, said second portion having a second level sensor in communication with said second control board;
- said first control board is adapted to rotate said first motor in a forward direction when said first level sensor detects a forward tilt, said first control board is adapted to rotate said first motor in a reverse direction when said first level sensor detects a rearward tilt;
- said second control board is adapted to rotate said second motor in a forward direction when said second level sensor detects a forward tilt, said second control board is adapted to rotate said second motor in a reverse direction when said second level sensor detects a rearward tilt;
- a central shaft having an outside diameter with a central shaft axis;
- said first portion receiving a portion of said central shaft and rotatable with respect to said central shaft on said central shaft axis, said first portion having a first gear rotatably fixed with respect to said first portion with a radius larger than said outside diameter of said central shaft, said first gear having a center coaxial to said central shaft axis;
- said second portion receiving a portion of said central shaft and rotatable with respect to said central shaft on said central shaft axis, said second portion having a second gear having a radius larger than said outside diameter, said second gear having a center coaxial to said central shaft axis; and
- a center section located between said first and second portions and having a spider gear rotatable therewith, said spider gear meshing with said first and second gears, said spider gear rotatable about a spider axis fixed with respect to said center section, said spider axis is perpendicular to and intersecting said central shaft axis, when said first portion rotates with respect to said center section, said second portion rotates in a direction opposite said first portion.

14. The scooter according to claim 13, said first axis being coaxial to said second axis.

15. The scooter according to claim 14, said central shaft axis being coaxial to said first and second axes.

16. The scooter according to claim 13, said first and second gears being sector gears.

17. The scooter according to claim 13, said spider gear resisting rotation with respect to said center section.

18. The scooter according to claim 13, said first and second portions having rider presence sensors, said rider presence sensors switchable between an absent state defined by said rider not in contact with said first and second portions and a present state defined by said rider in contact with said first and second portions.

19. The scooter of claim 18, when said rider presence sensors are in said absent state, said first and second control boards allowing said first and second wheels to freely rotate.

* * * * *